(No Model.)
I. B. BROOKS.
COUPLING LINK OR RING FOR CHAINS.
No. 599,927. Patented Mar. 1, 1898.
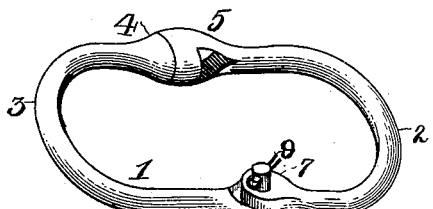
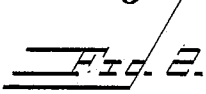
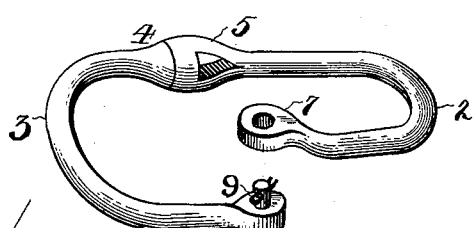
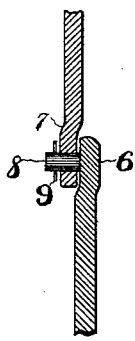
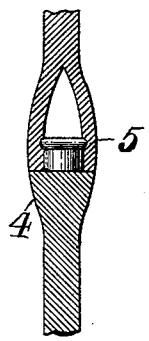
Witnesses
J. C. Cobb.
W. F. Riley
Inventor
Isaac B. Brooks.
By his Attorneys,
C. A. Snow & Co.
THE NORRIS PETERS CO., PHOTO-LITHO., WASHINGTON, D. C.

UNITED STATES PATENT OFFICE.

ISAAC B. BROOKS, OF OCEANA, WEST VIRGINIA.

COUPLING LINK OR RING FOR CHAINS.

SPECIFICATION forming part of Letters Patent No. 599,927, dated March 1, 1898.

Application filed July 16, 1897. Serial No. 644,810. (No model.)

*To all whom it may concern:*

Be it known that I, ISAAC B. BROOKS, a citizen of the United States, residing at Oceana, in the county of Wyoming and State of West Virginia, have invented a new and useful Coupling Link or Ring for Chains, of which the following is a specification.

The invention relates to improvements in coupling links or rings for chains.

The object of the present invention is to improve the construction of links or rings and to provide a simple, strong, and efficient one adapted to be readily opened and closed for coupling chains or portions of a chain to connect the ends of the latter.

The invention consists in the construction and novel combination and arrangement of parts, as hereinafter fully described, illustrated in the accompanying drawings, and pointed out in the claims hereto appended.

In the drawings, Figure 1 is a perspective view of a coupling link or ring constructed in accordance with this invention. Fig. 2 is a similar view, the link or ring being open. Figs. 3 and 4 are detail sectional views taken longitudinally of the link at opposite sides thereof.

Like numerals of reference designate corresponding parts in the several figures of the drawings.

1 designates a coupling link or ring composed of two substantially semicircular sections 2 and 3, having their ends 4 and 5 at one side of the link or ring swiveled together, and having their other ends 6 and 7 detachably connected and adapted to be readily released to permit the sections 2 and 3 to turn on the swivel-joint for opening the link or ring, as clearly illustrated in Fig. 2 of the accompanying drawings. The end 5 of the section 3 is provided with a tubular portion forming a socket and receiving the end 4 of the other section 2, the said end 4 being reduced and arranged within the tubular end 5 and forming a swivel-joint, as clearly illustrated in Fig. 4 of the accompanying drawings. The end 6 of the section 2 is slightly enlarged and is provided at one side of the link or ring with a stud 8, and the corresponding end 7 of the other section 3 is provided with an eye which receives the stud 8, as clearly shown in Figs. 1 and 3 of the accompanying drawings. The stud 8 is provided with a perforation which receives a split key 9, adapted to be readily removed from and introduced into the perforation to release and lock the sections of the coupling link or ring.

The invention has the following advantages: The coupling link or ring is simple and inexpensive in construction, and by being divided transversely it may be opened and closed quickly, and an eye or ring may be readily linked into it without interfering with the opening and closing movements. The connections between the ends of the sections possess great strength, making the link or ring substantially as strong as an ordinary continuous link, and one side of the coupling link or ring is as strong as the other.

Changes in the form, proportion, and minor details of construction may be resorted to without departing from the spirit or sacrificing any of the advantages of this invention.

What I claim is—

1. A coupling link or ring composed of two sections having their terminals swiveled together at one side of the link or ring to permit the other terminals to be swung apart, one of the latter being provided with an eye and the other having a stud passing through the said eye, and a removable fastening device passing through the stud and engaging the said eye, substantially as and for the purpose described.

2. A coupling link or ring divided transversely and composed of two sections having their terminals at one side of the link or ring abutting against each other and permanently swiveled together, the other terminals of the sections being overlapped, and a fastening device detachably locking the overlapped ends in contact with each other and adapted to release the same, whereby one of the sections may be swung transversely of the link or ring to open the same, substantially as described.

In testimony that I claim the foregoing as my own I have hereto affixed my signature in the presence of two witnesses.

ISAAC B. BROOKS.

Witnesses:
A. M. STEWART,
M. F. MATHENY.